(No Model.)
J. A. ARMENT.
CAR COUPLING.
No. 310,015. Patented Dec. 30, 1884.
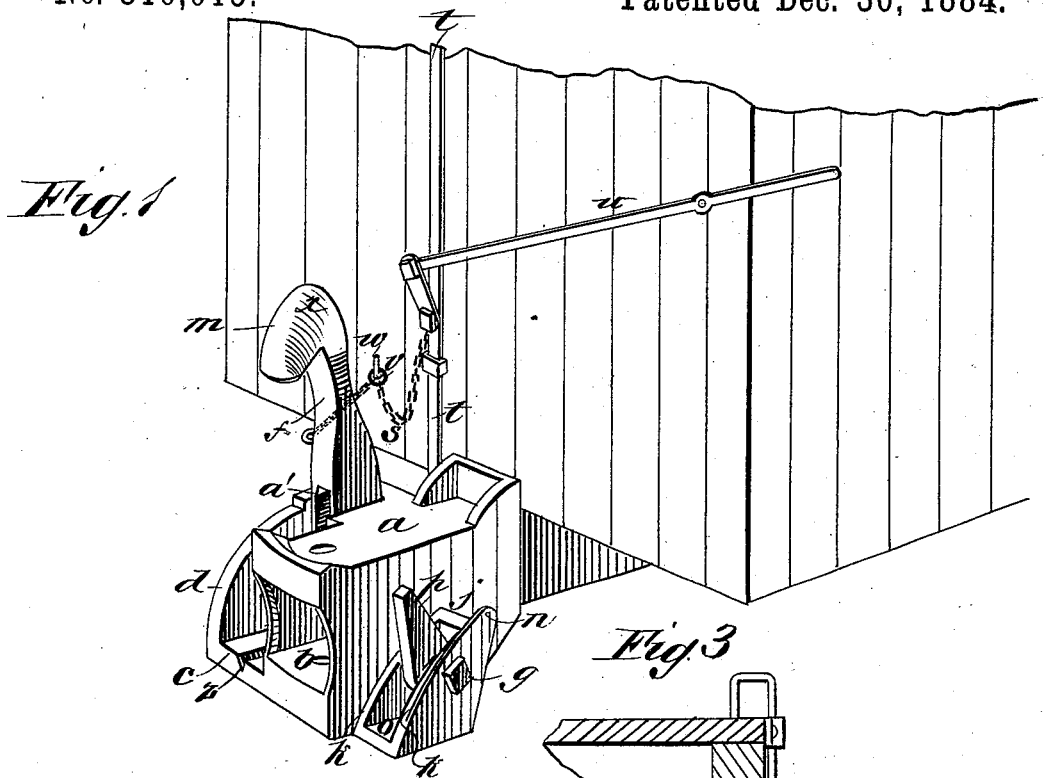
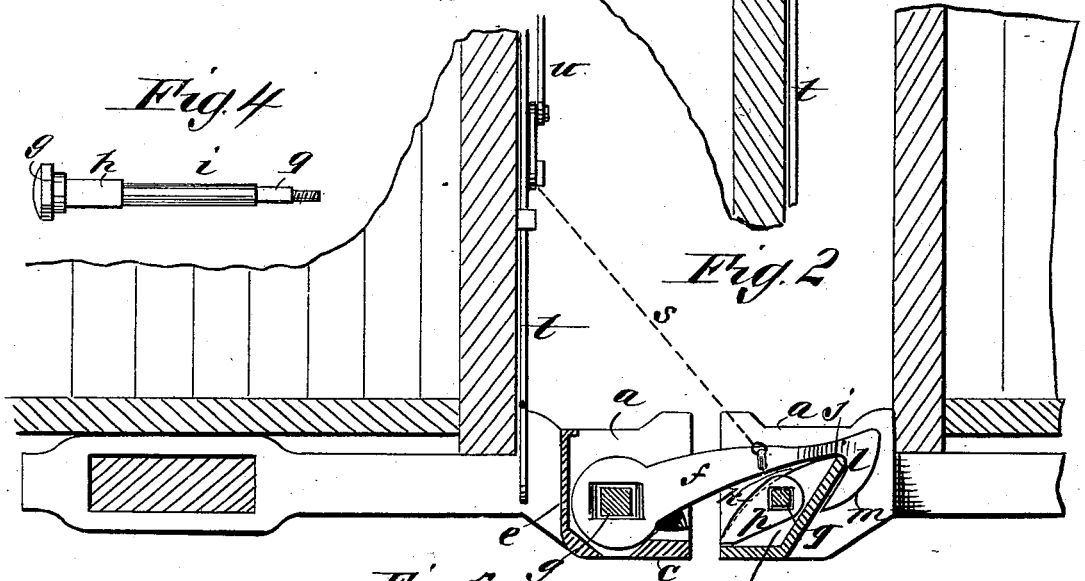
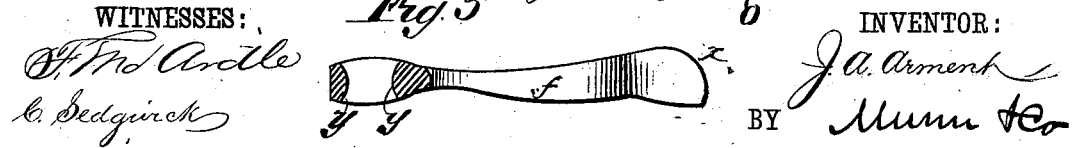
WITNESSES:
INVENTOR:
J. A. Arment
BY Munn & Co
ATTORNEYS.

UNITED STATES PATENT OFFICE.

JAMES A. ARMENT, OF DODGE CITY, KANSAS.

CAR-COUPLING.

SPECIFICATION forming part of Letters Patent No. 310,015, dated December 30, 1884.

Application filed April 15, 1884. (No model.)

*To all whom it may concern:*

Be it known that I, JAMES A. ARMENT, of Dodge City, in the county of Ford and State of Kansas, have invented a new and Improved Car-Coupling, of which the following is a full, clear, and exact description.

My invention consists of a draw-head having the ordinary link-socket, for coupling by the ordinary link and pin, with a vertically-swinging self-coupling hook in a recess on one side of the draw-head, and a catch device for the hook of the opposing draw-head; also with a cam in a recess of the catch, attached to the axis of the hook, and so arranged that when the hook is lifted for uncoupling, the cam is also turned and detaches the hook of the opposing draw-head, making a substantial contrivance by which the cars are coupled by two hooks, one on each car, and both are detached by one movement of the lever of either hook, all as hereinafter fully described.

Reference is to be had to the accompanying drawings, forming a part of this specification, in which similar letters of reference indicate corresponding parts in all the figures.

Figure 1 is a perspective view of part of a box-car with my improved coupling fitted to it. Fig. 2 is a sectional elevation of two cars and their draw-heads coupled with my improved coupling. Fig. 3 is a detail of the upper portion of a car in section, showing the arrangement of the device for uncoupling from the top of the car. Fig. 4 is a side view of the pivot-bolt of the coupling-hook, and Fig 5 is a top view of the coupling-hook with a part in horizontal section.

To one side of the ordinary draw-head, $a$, having a socket, $b$, for the ordinary coupling link and pin I add a laterally-projecting bottom plate, $c$, with a vertical plate, $d$, and a back plate, $e$, forming a recess in which I pivot the coupling-hook $f$ on a bolt, $g$, having a square shank, $h$, to which the eye of the hook corresponds, so that the bolt, which is round in the part $i$, having the bearing in the draw-head, will turn as the hook swings in coupling and uncoupling. On the other side of the draw-head I provide a catch, $j$, for the head $l$ of the hook to engage, said catch being a lateral extension formed on the side of the draw-head, with an inclined front, $k$, up which the curved nose $m$ of the hook $f$ will glide self-actingly when the cars run together to couple automatically. The outside of the top of the catch has a flange, $n$, extending sufficiently above said top to prevent the hook from escaping off the side of the catch, and in the inclined front face, $k$, of the catch is a recess, $o$, in which I arrange a cam, $p$, on the square section $q$ of the pivot-bolt, in such manner that said cam rests in the recess when the nose of the hook is coupled on the catch $j$, and cam $p$ forms part of the incline $k$, on which the hook of the other car begins to rise to the catch, said cam $p$ rising a little under the hook as the hook, to the pivot of which the cam is attached, rises up the incline of the other car, but not so much as to interfere with the automatic ascent of the incline by the hook. The hook is connected by a chain, $s$, with a vertically-sliding rod, $t$, fitted to the front end of the car, to reach to the top of the same, for enabling the brakeman thereon to uncouple the cars, and a lever, $u$, is connected to said bar suitably for lifting the hook from the side of the car. The chain $s$ has a ring, $v$, at a suitable point to hook on a catch, $w$, on the end of the car for holding up the hook out of the way when coupling by the ordinary link-and-pin device, or when it may be required for any purpose. The chain may be detached from catch $w$ by the lever $u$ or the rod $t$, to let the hook down, when required, without going between the cars.

It will be seen that pulling the hook of one car up to disconnect it from the other car will also detach the hook of the other car by throwing it up with the cam $p$ of the hook that is pulled up by the chain.

Besides the curve $m$ of the nose of the hook to facilitate the rising of the same on the incline $k$, I also construct the side $x$ next to the draw-head on a suitable curve to enable it to clear the corner of the draw-head $a$, when the hook may happen to shift in that direction by the lateral play it has on the pivot-bolt, or by the way the cars may be set. The hook must have the required lateral play to accommodate it to the lateral vibrations and for passing curves, and for this purpose is made sufficiently slack between the sides of the recess in which it is fitted, and the front and rear walls, $y$, of the eye of the hook are suitably curved to allow of such vibration. At the same time the hook must be maintained in the right line for self-coupling, for which I provide a V-groove, $z$, in the bottom plate, $c$, and a corresponding V-rib, $a'$, on the under side of the hook, to rest in said groove and center the hook in the position for insuring the advance of the hook in the right course on the catch.

I propose to cast the draw-head with the plates $c$, $d$, and $e$ forming the recess, and the catch $j$ together, as the simplest means of constructing them.

The arrangement of the hook $f$ and cam $p$ is such that, when one of the hooks is pulled up by the chain for uncoupling, the hook and cam will remain up, holding the hook of the other car on the end of the cam while the cars remain standing, and so that when they separate the hook resting on the cam will pull away from it, and in doing so will pull the cam so as to swing the hook connected to said cam down into the position for coupling, thus automatically setting the hook for self-coupling.

Having thus described my invention, I claim as new and desire to secure by Letters Patent—

1. In a car-coupling, the draw-head $a$, having upon one side the chambered extension containing the coupling-hook $f$, said draw-head having upon its opposite side a chamber or recess, $o$, and the shaft or bolt $g$, having the round surface $i$ and the angular surfaces $g$ $h$ and the cam $p$, said cam thereby being adapted to stand at such an angle, when one pin is elevated, that the other pin will readily escape from said cam, substantially as and for the purpose set forth.

2. The combination, with the V-rib $a'$ on the hook $f$, and the bottom plate, $c$, of the recess for the hook, having the V-groove $z$ for said rib, substantially as described.

JAMES A. ARMENT.

Witnesses:
T. J. WRIGHT,
T. F. STURTEVANT.